United States Patent

Hashimoto

[11] Patent Number: 6,154,575
[45] Date of Patent: Nov. 28, 2000

[54] IMAGE THICKENING PROCESSING METHOD AND APPARATUS

[75] Inventor: Koichi Hashimoto, Ibaraki-ken, Japan

[73] Assignee: Riso Kagaku Corporation, Tokyo, Japan

[21] Appl. No.: 09/076,104

[22] Filed: May 12, 1998

[30] Foreign Application Priority Data

May 12, 1997 [JP] Japan ................................. 9-121233

[51] Int. Cl.[7] ................................. G06K 9/42; G06T 5/20
[52] U.S. Cl. ................................. 382/258; 382/195
[58] Field of Search ................................. 382/258, 256, 382/195, 205

[56] References Cited

U.S. PATENT DOCUMENTS

| | | | |
|---|---|---|---|
| 5,054,099 | 10/1991 | Wakabayashi et al. | 382/258 |
| 5,748,798 | 5/1998 | Nakai et al. | 382/258 |
| 5,799,113 | 8/1998 | Lee | 382/256 |
| 5,887,081 | 3/1999 | Bantum | 382/256 |

FOREIGN PATENT DOCUMENTS 0 708 415 A2  4/1996  European Pat. Off. .

| | | |
|---|---|---|
| 3-16758 | 1/1991 | Japan . |
| 6-152932 | 5/1994 | Japan . |

*Primary Examiner*—Scott Rogers
*Attorney, Agent, or Firm*—Nixon Peabody LLP; Donald R. Studebaker

[57] ABSTRACT

In an image thickening processing method, a thickening processing is carried out on a binary image made up of black picture elements and white picture elements, which are adjacent to one another along vertical and horizontal directions. Each of the black picture elements is set as a black picture element of interest. A vertically adjacent picture element, which is adjacent to the black picture element of interest along a single vertical direction, and a horizontally adjacent picture element, which is adjacent to the black picture element of interest along a single horizontal direction, are detected. Also, an obliquely adjacent picture element, which is adjacent to all of the black picture element of interest, the vertically adjacent picture element, and the horizontally adjacent picture element, is detected. Each of the thus detected three adjacent picture elements is set as a black picture element only in cases where each of the thus detected three adjacent picture elements does not belong to a region, which is surrounded by a plurality of black picture elements and is to be recorded as a blank.

4 Claims, 14 Drawing Sheets

▨ : PICTURE ELEMENT CONVERTED FROM WHITE TO BLACK

LOADING OF JUDGMENT MATRIX

| A | B | C |
|---|---|---|
| D | E | F |
| G | H | I |

FIG.9A
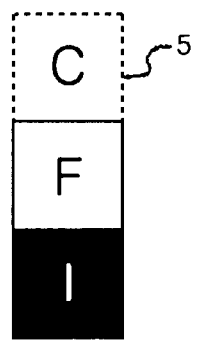
FIG.9B
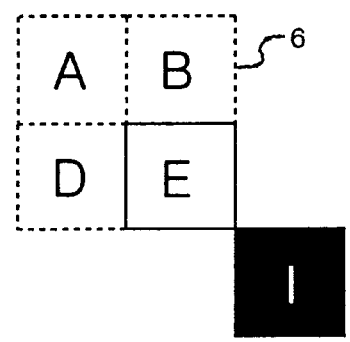
FIG.9C
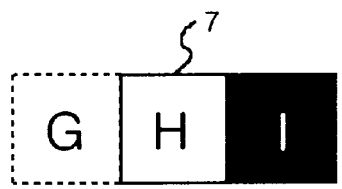
BLACK
WHITE

FIG.16
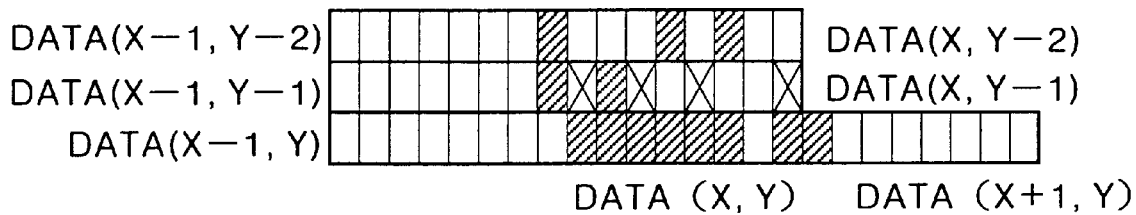
DATA(X−1, Y−2)   DATA(X, Y−2)
DATA(X−1, Y−1)   DATA(X, Y−1)
DATA(X−1, Y)
            DATA (X, Y)   DATA (X+1, Y)
 L
 R1
 R2
 DATA(X, Y−2)
 DATA(X, Y−1)
 DATA(X, Y)
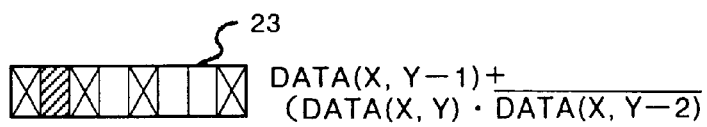
23
$\text{DATA}(X, Y-1) + $
$(\text{DATA}(X, Y) \cdot \overline{\text{DATA}(X, Y-2)})$
24
$\text{DATA}(X, Y-1) + $
$L \cdot R1 \cdot R2 \cdot \overline{\text{DATA}(X, Y-2)}$
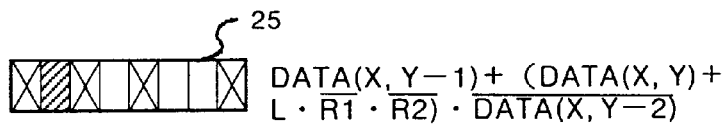
25
$\text{DATA}(X, Y-1) + (\text{DATA}(X, Y) + $
$L \cdot R1 \cdot R2) \cdot \overline{\text{DATA}(X, Y-2)}$

FIG.17
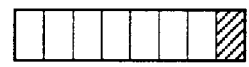
DATA(X−1, Y)
DATA (X, Y)
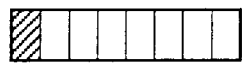
DATA(X+1, Y)
 L
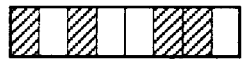 R
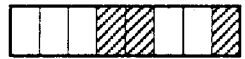 L·R̄
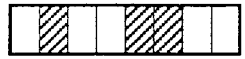 DATA(X, Y)
 DATA(X, Y)+L·R̄
FIG.18
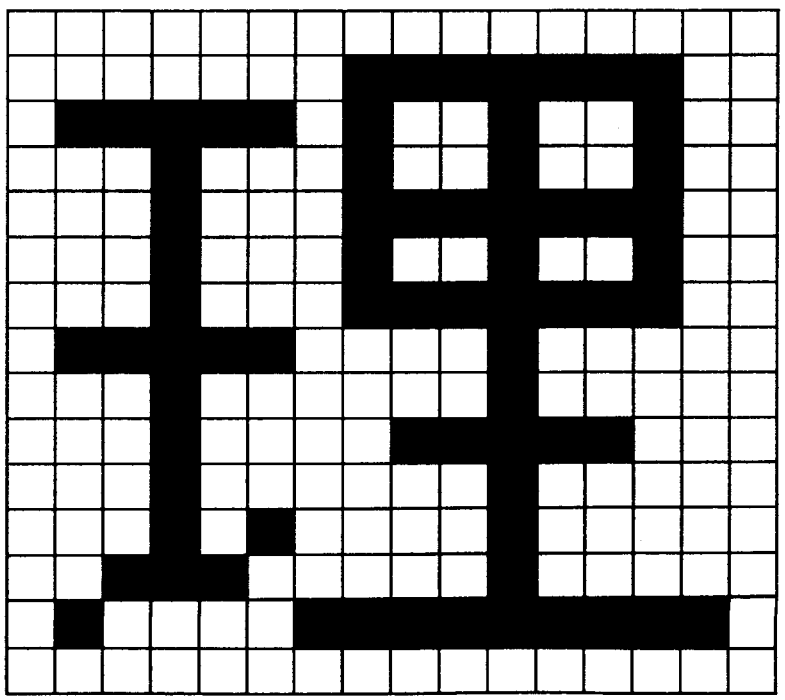

FIG.19
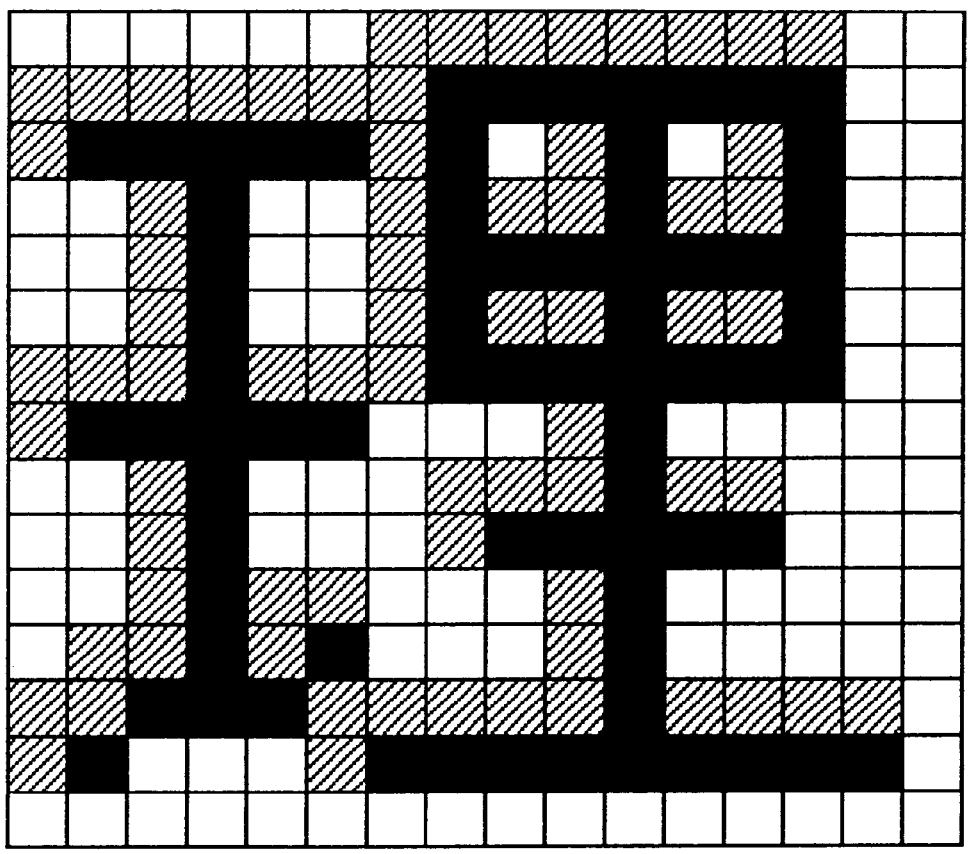
 : PICTURE ELEMENT CONVERTED FROM WHITE TO BLACK
PRIOR ART

IMAGE THICKENING PROCESSING METHOD AND APPARATUS

BACKGROUND OF THE INVENTION

1. Field of the Invention

This invention relates to a method and apparatus for carrying out image processing on a binary image signal, which is obtained from a computer, an image read-out apparatus, or the like. This invention particularly relates to a character pattern and line pattern thickening processing (hereinbelow referred to simply as the thickening processing) for thickening a character pattern and a line pattern in a binary image, which is represented by a digital signal.

2. Description of the Prior Art

In cases where binary images, which have been formed with application software functions, such as word processors in computers, or binary images, which have been read out with image read-out apparatuses, such as image scanners, are printed by using digital stencil printers, the problems are often encountered in that small character patterns or thin character patterns become blurred on the obtained prints. Also, several fonts used in application software functions in computers have the problems in that, when the character patterns and line patterns belonging to the fonts are printed by using digital stencil printers, printed images, which look thin and weak, are obtained. Further, besides digital stencil printers, with devices for printing binary images, including character patterns and line patterns, which are represented by digital signals, such as printers for personal computers and facsimile devices, the problems are often encountered in that the printed small character patterns and thin character patterns become blurred and cannot easily be perceived visually.

In order to prevent the printed images from becoming blurred or looking thin and weak (hereinbelow referred to as the blurring, or the like), an image forming apparatus, which expands a character pattern or a line pattern in a binary image by simply adding black picture elements to the upper position, the lateral position, and the oblique position with respect to a black picture element in the binary image. Such an image forming apparatus is proposed in, for example, Japanese Unexamined Patent Publication No. 6(1994)-152932.

As another technique for preventing a printed image from blurring, or the like, a technique has been proposed, wherein a contour of a binary image is discriminated and the thickness of a line is changed in accordance with the results of the discrimination such that the contour may be retained. Such a technique is proposed in, for example, Japanese Unexamined Patent Publication No. 3(1991)-16758.

However, the conventional techniques described above has the practical problems described below.

Specifically, the technique proposed in Japanese Unexamined Patent Publication No. 6(1994)-152932 has the problems in that a blank region, which is to be kept as a blank, becomes black and is lost. The problems will be described hereinbelow with reference to FIGS. 18 and 19, which show an example of the thickening processing carried out on a binary image signal by the utilization of the proposed technique. FIG. 18 is a matrix diagram showing an example of an original binary image to be subjected to thickening processing. FIG. 19 is a matrix diagram showing a binary image, which is obtained from thickening processing carried out on the original image of FIG. 18 by using an example of conventional technique (proposed in Japanese Unexamined Patent Publication No. 6(1994)-152932). With the proposed technique, black picture elements are simply added to the upper position, the left position, and the upper left position with respect to a black picture element in the original image. Therefore, in cases where the thickening processing is carried out with the proposed technique, a white picture element, which is surrounded by a plurality of black picture elements, and a white picture element, which is sandwiched between adjacent black picture elements, are converted into black picture elements. Accordingly, it often occurs that a region, which is to be recorded as a blank, becomes black and is lost. For example, the two lower blank regions among the four blank regions, which are defined by the three vertical black lines and the three horizontal black lines at the upper half of the right-hand radical of the Chinese character pattern in the original image shown in FIG. 18, become black and are lost as illustrated in FIG. 19. Also, the blank region, which is located between the left-hand radical and the right-hand radical of the Chinese character pattern, becomes black and is lost as illustrated in FIG. 19. As a result, the problems occur in that the image becomes unsharp and hard to see and cannot be read. Also, the character pattern, in which the blank regions that are to be retained have become black and have been lost, cannot give a good aesthetic feeling to persons who see it.

With the technique proposed in Japanese Unexamined Patent Publication No. 3(1991)-16758, the thickness of a line can be changed such that a blank region may not become black and may not be lost. However, the proposed technique has the drawbacks in that very complicated discrimination processing must be carried out in order to discriminate the contours of character patterns and line patterns in a binary image.

SUMMARY OF THE INVENTION

The primary object of the present invention is to provide an image thickening processing method, wherein a character pattern and a line pattern in a binary image are thickened with a simple processing, such that a blank region in the binary image, which blank region is to be retained, may be prevented from becoming black and being lost.

Another object of the present invention is to provide an apparatus for carrying out the image thickening processing method.

An image thickening processing method in accordance with the present invention, wherein a thickening processing is carried out on a binary image made up of a plurality of black picture elements and white picture elements, which are adjacent to one another along vertical and horizontal directions, is characterized by setting each of the black picture elements as a black picture element of interest, detecting a vertically adjacent picture element, which is adjacent to said black picture element of interest along a single vertical direction, a horizontally adjacent picture element, which is adjacent to said black picture element of interest along a single horizontal direction, and an obliquely adjacent picture element, which is adjacent to all of said black picture element of interest, said vertically adjacent picture element, and said horizontally adjacent picture element, and setting each of the thus detected three adjacent picture elements as a black picture element only in cases where each of the thus detected three adjacent picture elements does not belong to a region, which is surrounded by a plurality of black picture elements and is to be recorded as a blank.

Specifically, the present invention provides an image thickening processing method, wherein a thickening processing is carried out on a binary image made up of a plurality of black picture elements and white picture elements, which are adjacent to one another along vertical and horizontal directions, the method comprising the steps of:

i) setting each of the black picture elements as a black picture element of interest, ii) detecting a vertically adjacent picture element, which is adjacent to the black picture element of interest along a single vertical direction, a horizontally adjacent picture element, which is adjacent to the black picture element of interest along a single horizontal direction, and an obliquely adjacent picture element, which is simultaneously adjacent to the vertically adjacent picture element, the horizontally adjacent picture element, and the black picture element of interest, and iii) carrying out the thickening processing by:

a) setting the vertically adjacent picture element as a black picture element only in cases where a picture element, which is adjacent to the vertically adjacent picture element even further along the single vertical direction, has been judged as being a white picture element, b) setting the horizontally adjacent picture element as a black picture element only in cases where a picture element, which is adjacent to the horizontally adjacent picture element even further along the single horizontal direction, has been judged as being a white picture element, and c) setting the obliquely adjacent picture element as a black picture element only in cases where all of a picture element, which is adjacent to the obliquely adjacent picture element even further along the single vertical direction, a picture element, which is adjacent to the obliquely adjacent picture element even further along the single horizontal direction, and a picture element, which is adjacent to the obliquely adjacent picture element obliquely on the side opposite to the black picture element of interest, have been judged as being white picture elements.

The term "thickening" as used herein means all of the thickening of character patterns, the thickening of line patterns, and the like. The term "single vertical direction" as used herein means either one of the upward direction and the downward direction. The term "single horizontal direction" as used herein means either one of the rightward direction and the leftward direction. Also, the term "setting as a black picture element" as used herein means that a picture element, which was a white picture element in the binary image before being processed, is altered into a black picture element, and a picture element, which was a black picture element in the binary image before being processed, is not altered.

In cases where the picture element, which is adjacent to the vertically adjacent picture element even further along the single vertical direction, i.e., the picture element located on the side of the vertically adjacent picture element in the direction opposite to the black picture element of interest, (the next picture element but one to the black picture element of interest along the single vertical direction) is a black picture element, the vertically adjacent picture element is the region sandwiched between at least two black picture elements. In this state, in cases where the vertically adjacent picture element is a white picture element, the vertically adjacent picture element is the region, which was a blank in the binary image before being subjected to the thickening processing. Therefore, if the vertically adjacent picture element is altered into a black picture element in the thickening processing, the blank region will become black and is lost. Accordingly, in such cases, the alteration of the vertically adjacent picture element into a black picture element is not carried out, and the blank region is retained even after the thickening processing. Specifically, only when the picture element, which is adjacent to the vertically adjacent picture element even further along the single vertical direction, is a white picture element, the vertically adjacent picture element is altered into a black picture element. In the same manner, in cases where the picture element, which is adjacent to the horizontally adjacent picture element even further along the single horizontal direction, (the next picture element but one to the black picture element of interest along the single horizontal direction) is a black picture element, the alteration of the horizontally adjacent picture element into a black picture element is not carried out. Only when the next picture element but one to the black picture element of interest along the single horizontal direction is a white picture element, the horizontally adjacent picture element is altered into a black picture element.

In cases where at least one of the picture element, which is adjacent to the obliquely adjacent picture element even further along the single vertical direction, the picture element, which is adjacent to the obliquely adjacent picture element even further along the single horizontal direction, and the picture element, which is adjacent to the obliquely adjacent picture element obliquely on the side opposite to the black picture element of interest, is a black picture element, the obliquely adjacent picture element is the region sandwiched between at least two black picture elements. In this state, in cases where the obliquely adjacent picture element is a white picture element, the obliquely adjacent picture element is the region, which was a blank in the binary image before being subjected to the thickening processing. Therefore, if the obliquely adjacent picture element is altered into a black picture element in the thickening processing, the blank region will become black and is lost. Accordingly, in such cases, the alteration of the obliquely adjacent picture element into a black picture element is not carried out, and the blank region is retained even after the thickening processing. Specifically, only when all of the picture element, which is adjacent to the obliquely adjacent picture element even further along the single vertical direction, the picture element, which is adjacent to the obliquely adjacent picture element even further along the single horizontal direction, and the picture element, which is adjacent to the obliquely adjacent picture element obliquely on the side opposite to the black picture element of interest, are white picture elements, the obliquely adjacent picture element is altered into a black picture element.

In the aforesaid thickening processing, only the setting of a picture element as a black picture element is carried out (i.e., alteration of a black picture element into a white picture element is not carried out). Therefore, in cases where a certain single picture element, which can serve simultaneously as the vertically adjacent picture element, the horizontally adjacent picture element, and the obliquely adjacent picture element with respect to a plurality of picture elements, was a white picture element in the binary image before being subjected to the thickening processing, and in cases where the certain single picture element has been set as a black picture element by being taken as an adjacent picture element with respect to a certain picture element of interest, even if the certain single picture element is not set as a black picture element when it is taken as an adjacent picture element with respect to a different picture element of interest, the certain single picture element becomes a black picture element. Specifically, a certain picture element, which is adjacent to a black picture element in the original image, is set as a black picture element at least in cases where the aforesaid conditions for the certain picture element to be set as a black picture element for the thickening in accordance with a single black picture element, to which the certain picture element is adjacent, are satisfied.

The aforesaid thickening processing is carried out with respect to the picture elements in the binary image before being subjected to the thickening processing, and is not carried out with respect to the picture elements after being subjected to the thickening processing. The thickening processing may be carried out simultaneously with respect to all picture elements. Alternatively, the thickening processing may be carried out successively with respect to the picture elements before being subjected to the thickening processing.

By way of example, in cases where the thickening processing is carried out successively, the upward direction is employed as the single vertical direction, and the leftward direction is employed as the single horizontal direction. Also, the main scanning of the picture elements in the binary image is carried out along the rightward direction, and the sub-scanning of the picture elements in the binary image is carried out along the downward direction. In such cases, the picture elements in the binary image are not processed all at once, and are successively set as a black picture element for the thickening. However, since a picture element, which is located on the downstream side of the scanning direction from the picture element that is being processed at any given instant, is not set as a black picture element, there is no risk that a picture element after being subjected to the thickening processing will adversely affect the thickening processing.

The present invention also provides an image thickening processing apparatus, wherein a thickening processing is carried out on a binary image made up of a plurality of black picture elements and white picture elements, which are adjacent to one another along vertical and horizontal directions, the apparatus comprising:

i) a judgment means for:
  setting each of the black picture elements as a black picture element of interest,
  detecting a vertically adjacent picture element, which is adjacent to the black picture element of interest along a single vertical direction, a horizontally adjacent picture element, which is adjacent to the black picture element of interest along a single horizontal direction, and an obliquely adjacent picture element, which is simultaneously adjacent to the vertically adjacent picture element, the horizontally adjacent picture element, and the black picture element of interest, and
  making judgments as to:
    a) whether a picture element, which is adjacent to the vertically adjacent picture element even further along the single vertical direction, is or is not a white picture element,
    b) whether a picture element, which is adjacent to the horizontally adjacent picture element even further along the single horizontal direction, is or is not a white picture element, and
    c) whether all of a picture element, which is adjacent to the obliquely adjacent picture element even further along the single vertical direction, a picture element, which is adjacent to the obliquely adjacent picture element even further along the single horizontal direction, and a picture element, which is adjacent to the obliquely adjacent picture element obliquely on the side opposite to the black picture element of interest, are or are not white picture elements, and ii) a thickening means for:
  a) setting the vertically adjacent picture element as a black picture element only in cases where the picture element, which is adjacent to the vertically adjacent picture element even further along the single vertical direction, has been judged by the judgment means as being a white picture element,
  b) setting the horizontally adjacent picture element as a black picture element only in cases where the picture element, which is adjacent to the horizontally adjacent picture element even further along the single horizontal direction, has been judged by the judgment means as being a white picture element, and
  c) setting the obliquely adjacent picture element as a black picture element only in cases where all of the picture element, which is adjacent to the obliquely adjacent picture element even further along the single vertical direction, the picture element, which is adjacent to the obliquely adjacent picture element even further along the single horizontal direction, and the picture element, which is adjacent to the obliquely adjacent picture element obliquely on the side opposite to the black picture element of interest, have been judged by the judgment means as being white picture elements.

With the image thickening processing method and apparatus in accordance with the present invention, each of the black picture elements is set as a black picture element of interest. Also, the vertically adjacent picture element, which is adjacent to the black picture element of interest along the single vertical direction, the horizontally adjacent picture element, which is adjacent to the black picture element of interest along the single horizontal direction, and the obliquely adjacent picture element, which is adjacent to all of the black picture element of interest, the vertically adjacent picture element, and the horizontally adjacent picture element, are detected. Each of the thus detected three adjacent picture elements is set as a black picture element only in cases where each of the thus detected three adjacent picture elements does not belong to a region, which is surrounded by a plurality of black picture elements and is to be recorded as a blank. Therefore, a character pattern and a line pattern in the binary image can be thickened, such that a blank region which is to be retained in the binary image may be prevented from becoming black and being lost. Accordingly, the blurring, or the like, of the printed image can be prevented.

In practice, in cases where character patterns, and the like, of a font, which has the characteristics such that the character patterns, and the like, looking thin and weak may be obtained on a print, are printed, the processing with the image thickening processing method and apparatus in accordance with the present invention may be carried out before the printing operation is carried out. In this manner, a binary image, which has an appropriate thickness and is easy to see and read, can be printed.

In cases where the thickening processing with respect to each picture element in accordance with the present invention is carried out simultaneously for a plurality of picture elements, the operations can be kept simple and can therefore be carried out with a small-scaled circuit. Also, in cases where such processing is built in software functions of a printer driver, or the like, since the processing is simple, quick printing can be carried out, and the problems can be prevented from occurring in that the user must wait for a markedly longer time than when no thickening processing is carried out.

The effects described above can be obtained when a digital stencil printer is used and when other types of printers, such as laser printers, are used.

BRIEF DESCRIPTION OF THE DRAWINGS

FIG. 7 is an explanatory view showing a binary image signal stored in the embodiment of FIG. 2, FIG. 8 is an explanatory view showing a judgment matrix employed in the embodiment of FIG. 2, FIGS. 9A, 9B, and 9C are explanatory views showing judgment patterns employed in the embodiment of FIG. 2, FIG. 16 is an explanatory view showing an example of execution in the embodiment of FIG. 10, FIG. 17 is an explanatory view showing a different example of execution in the embodiment of FIG. 10, FIG. 18 is a matrix diagram showing an example of an original binary image to be subjected to thickening processing, and FIG. 19 is a matrix diagram showing a binary image, which is obtained from thickening processing carried out on the original image of FIG. 18 by using an example of conventional technique (proposed in Japanese Unexamined Patent Publication No. 6(1994)-152932).

DESCRIPTION OF THE PREFERRED EMBODIMENTS

The present invention will hereinbelow be described in further detail with reference to the accompanying drawings.

Figure 1:
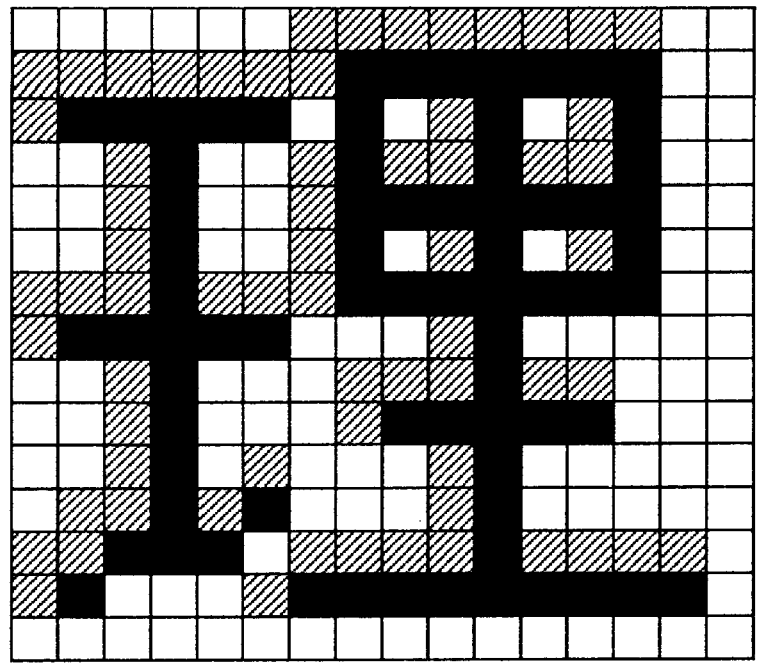
FIG. 1 is a schematic view showing an example of an image, which is obtained from thickening processing carried out with an embodiment of the image thickening processing method in accordance with the present invention.

FIG. 1 shows an example of an image, which is obtained from thickening processing carried out on an original image shown in FIG. 18 by using the below-described image thickening processing method and apparatus in accordance with the present invention. As is clear from FIG. 1, an image, in which the lines constituting a character pattern have been thickened, can be obtained such that a blank region to be retained, which became black and was lost with the technique proposed in Japanese Unexamined Patent Publication No. 6(1994)-152932, may not become black and may not be lost.

Figure 2:
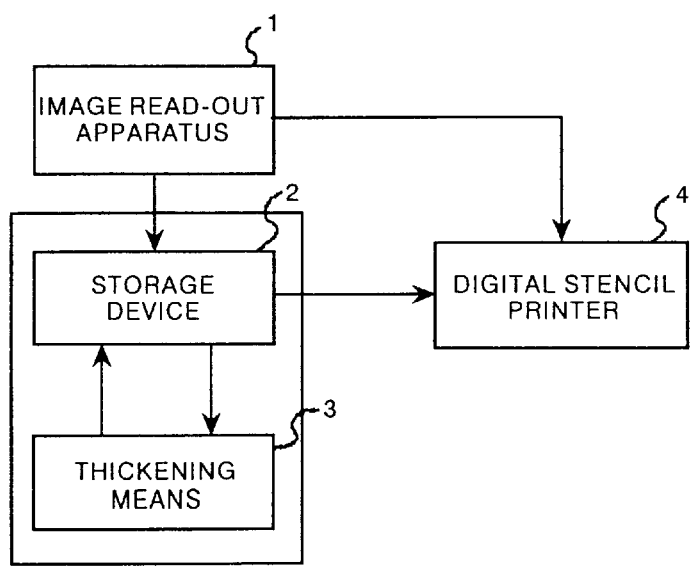
FIG. 2 is a block diagram showing an embodiment of the image thickening processing apparatus in accordance with the present invention.
Figure 3:
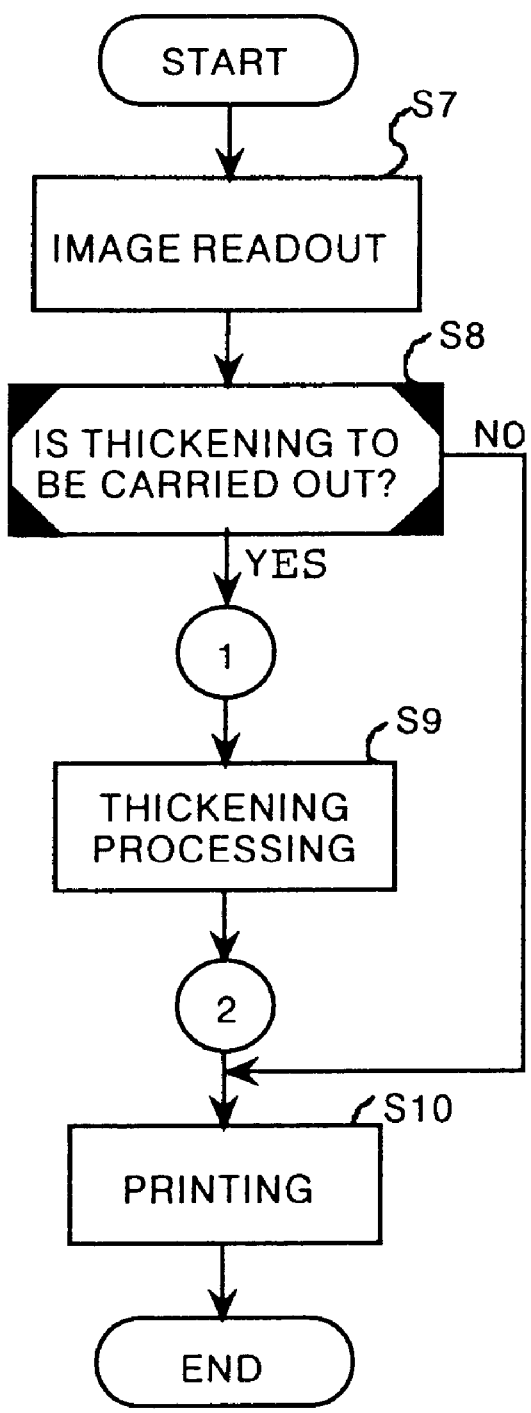
FIG. 3 is a flow chart showing entire processing carried out in the embodiment of FIG. 2.

FIG. 2 is a block diagram showing an embodiment of the image thickening processing apparatus in accordance with the present invention. When an image is to be printed, the operator arbitrarily selects whether the thickening processing is or is not to be carried out, and information representing the results of the selection is fed into an image read-out apparatus 1. In cases where the thickening processing is not to be carried out, a binary image signal, which has been detected by the image read-out apparatus 1 and fed out therefrom, is transmitted directly into a digital stencil printer 4 and used in an ordinary printing operation carried out by the digital stencil printer 4. In cases where the thickening processing is to be carried out, the binary image signal, which has been detected by the image read-out apparatus 1, is transmitted from the image read-out apparatus 1 into a storage device 2 and stored therein. Character patterns, line patterns, and the like, which are represented by the binary image signal stored in the storage device 2, are subjected to the thickening processing, which is carried out by a thickening means 3 connected to the storage device 2. A binary image signal, which has been obtained from the thickening processing, is overwritten on the binary image signal, which has been stored in the storage device 2. After the thickening processing on all of the character patterns and the line patterns, which are represented by the binary image signal, has been finished, the binary image signal, which has been obtained from the thickening processing and is now stored in the storage device 2, is transmitted into the digital stencil printer 4.

Figure 4:
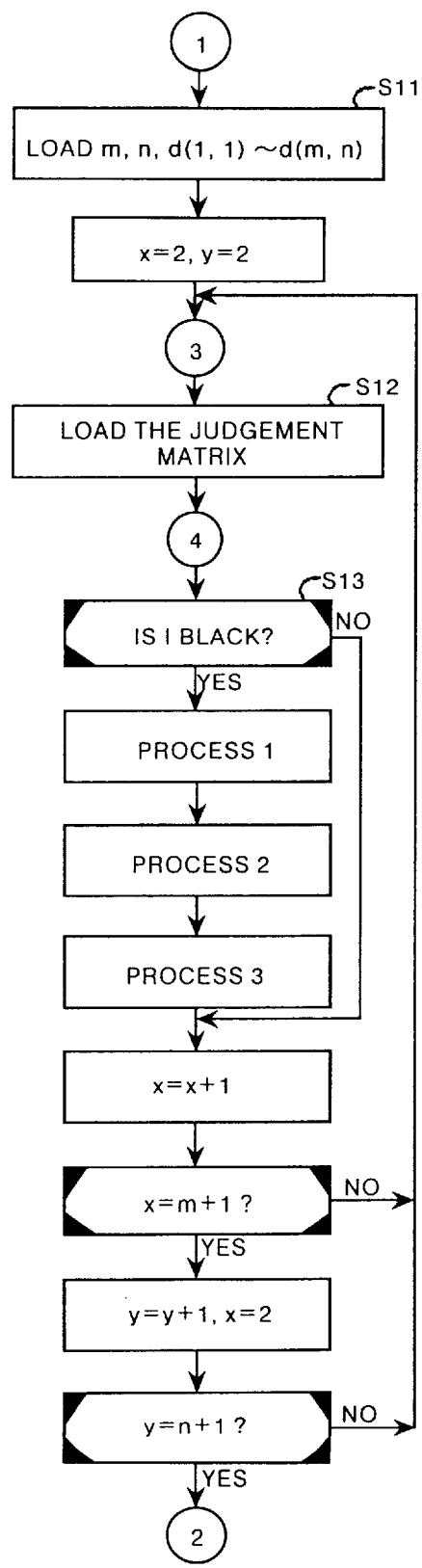
FIG. 4 is a flow chart showing how the thickening processing is carried out in the embodiment of FIG. 2.
Figure 5:
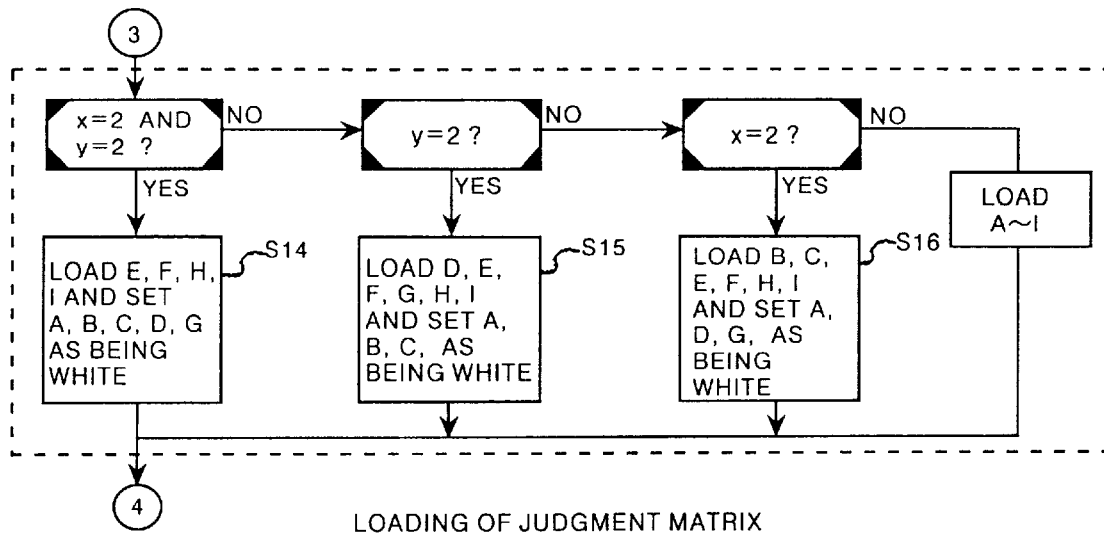
FIG. 5 is a flow chart showing how a judgment matrix loading step is carried out in the thickening processing.
Figure 6:
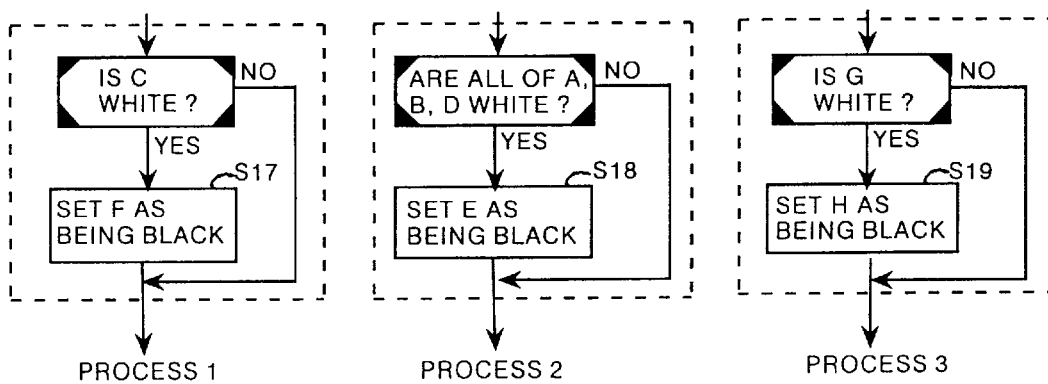
FIG. 6 is a flow chart showing how processes 1, 2, and 3 are carried out in the thickening processing.

FIGS. 3, 4, 5, and 6 are flow charts showing control operation procedures in the image thickening processing carried out in the embodiment of FIG. 2. In an image read-out step S7, the image read-out apparatus 1 reads out a given image and obtains the binary image signal representing the original image. In a thickening judgment step S8, in accordance with the information representing the results of the selection made by the operator, a judgment is made as to whether the thickening processing is or is not to be carried out. In cases where it has been judged in the step S8 that the thickening processing is to be carried out, a thickening processing step S9 is carried out, and a printing operation is carried out in a printing step S10 by the digital stencil printer 4. In cases where it has been judged in the step S8 that the thickening processing is not to be carried out, the thickening processing step S9 is not carried out, and a printing operation is carried out in the printing step S10 by the digital stencil printer 4. FIG. 4 shows how the thickening processing is carried out in the thickening processing step S9. FIG. 5 shows how a judgment matrix loading step S12 is carried out in the thickening processing step S9 shown in FIG. 4. FIG. 6 shows how processes 1, 2, and 3 shown in FIG. 4 are carried out.

How the thickening processing step S9 is carried out by the thickening means 3 will be described hereinbelow with reference to the flow charts of FIGS. 3 through 6 and picture element matrix diagrams of FIGS. 7, 8, 9A, 9B, and 9C.

Figures 7, 8:
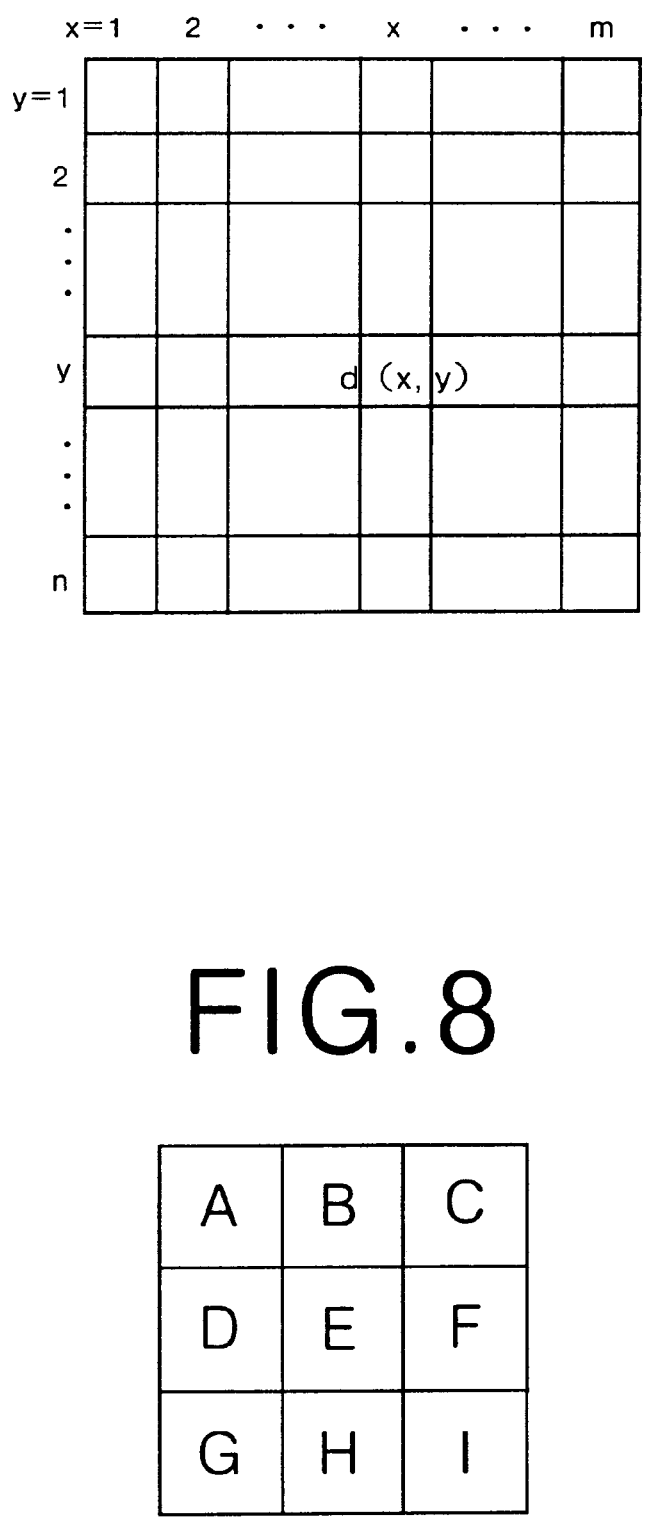

FIG. 7 shows an array of picture elements represented by a binary image signal, which has been obtained from the image read-out apparatus 1 and stored in the storage device 2. The array size along the main scanning direction (in this case, the horizontal direction) is represented by m, and the array size along the sub-scanning direction (in this case, the vertical direction) is represented by n. The spatial coordinate along the main scanning direction is represented by x, and the spatial coordinate along the sub-scanning direction is represented by y. In this case, $1 \leq x \leq m$, and $1 \leq y \leq n$. Also, the picture element value of the picture element, which is located at the spatial coordinates (x, y), is represented by d(x, y). The picture element value d(x, y) takes a value of 0 (representing white) or a value of 1 (representing black). FIG. 8 shows a judgment matrix having a size of 3×3 picture elements, which is used in making a judgment as to whether a character pattern, a line pattern, or the like, is or is not to be thickened. FIG. 8 shows the relationship among the positions of picture elements A, B, C, D, E, F, G, and H with the lower right picture element I being taken as a picture element of interest.

Algorithms of the thickening processing step S9 carried out by the thickening means 3 in this embodiment will be described hereinbelow with reference to the flow charts of FIGS. 4, 5, and 6. As an aid in facilitating the explanation, it is assumed that the picture elements, which are located along the top row in the array of the picture elements represented by the binary image signal, and the picture elements, which are located along the left end column in the array of the picture elements, are white. Specifically, it is assumed that d(x, 1)=0, and d(1, y)=0. Actually, the generality is not lost due to such assumption. In cases where the assumed conditions are not satisfied, means for forcibly converting the picture elements, which are located along the top row in the array of the picture elements represented by the binary image signal, and the picture elements, which are located along the left end column in the array of the picture elements, into white may be employed.

In a binary image signal loading step S11, the information representing the size, m, of the array of the picture elements, which are represented by the binary image signal, along the main scanning direction, the information representing the size, n, of the array of the picture elements along the sub-scanning direction, and the pieces of information, which represent the picture element values d(1, 1) through d(m, n), are loaded from the storage device 2 into the thickening means 3 ($m \geq 3$, $n \geq 3$). As described above, it is assumed that the picture elements, which are located along the top row in the array of the picture elements represented by the binary image signal, and the picture elements, which are located along the left end column in the array of the picture elements, are white. Therefore, the scanning of the loaded binary image signal is begun with the picture element having the spatial coordinates (x=2, y=2). In the judgment matrix loading step S12 shown in detail in FIG. 5, each of the scanned picture elements is taken as the picture element of interest I in the judgment matrix shown in FIG. 8, and the pieces of information representing the picture element values of the picture elements A through I, whose relative positions are defined in the judgment matrix, are loaded from the storage device 2.

Thereafter, in a picture-element-of-interest judging step S13, a judgment is made as to whether the picture element of interest I, which is among the picture elements loaded in the judgment matrix loading step S12, is or is not black. As illustrated in FIG. 6, in cases where it has been judged that the picture element of interest I is black, processes 1, 2, and 3 described below are carried out.

Process 1: As illustrated in FIG. 9A, in cases where the upper right picture element C is white, the middle right picture element F is set as a black picture element.

Process 2: As illustrated in FIG. 9B, in cases where the upper left picture element A, the upper middle picture element B, and the middle left picture element D are white, the center picture element E is set as a black picture element.

Process 3: As illustrated in FIG. 9C, in cases where the lower left picture element G is white, the lower middle picture element H is set as a black picture element.

Thereafter, the picture elements are scanned along the rightward direction from the picture element having the spatial coordinates (x=2, y=2). With respect to the picture element value of each of the scanned picture elements, the judgment matrix loading step S12, the picture-element-of-interest judging step S13, and the processes 1, 2, 3 are repeated. When the scanning and the processing up to the picture element having the spatial coordinates (x=m, y=2) have been finished, in the same manner as that described above, the picture elements located along the next row are scanned along the rightward direction, beginning with the picture element having the spatial coordinates (x=2, y=3). In this manner, the scanning and the processing are carried out with respect to the picture elements ranging from the picture element having the spatial coordinates (x=2, y=2) to the picture element having the spatial coordinates (x=m, y=n).

In cases where the picture element having the spatial coordinates (x=2, y=2) is taken as the picture element of interest I, the picture elements A, B, C, D, and G in the judgment matrix are located more outward than the array of the picture elements represented by the binary image signal, and therefore their values cannot be loaded from the storage device 2. In such cases, as illustrated in FIG. 5, the picture element values of the picture elements A, B, C, D, and G are forcibly set as being white (i.e., as a value of 0), and only the picture element values of the picture elements E, F, H, and I are loaded from the storage device 2. Also, in cases where one of the picture elements having the spatial coordinates ($x \neq 2$, y=2) is taken as the picture element of interest I, the picture elements A, B, and C in the judgment matrix are located more outward than the array of the picture elements represented by the binary image signal, and therefore their values cannot be loaded from the storage device 2. In such cases, as illustrated in FIG. 5, the picture element values of the picture elements A, B, and C are forcibly set as being white (i.e., as a value of 0), and only the picture element values of the picture elements D, E, F, G, H, and I are loaded from the storage device 2. Further, in cases where one of the picture elements having the spatial coordinates (x=2, y=$\neq$2) is taken as the picture element of interest I, the picture elements A, D, and G in the judgment matrix are located more outward than the array of the picture elements represented by the binary image signal, and therefore their values cannot be loaded from the storage device 2. In such cases, as illustrated in FIG. 5, the picture element values of the picture elements A, D, and G are forcibly set as being white (i.e., as a value of 0), and only the picture element values of the picture elements B, C, E, F, H, and I are loaded from the storage device 2.

When this embodiment is employed for the processing of the original image shown in FIG. 18, the results shown in FIG. 1 are obtained. In this embodiment, as will be understood from the foregoing, a picture element, which is located on the downstream side of the scanning direction from the picture element that is being processed at any given instant, is not set as a black picture element. Therefore, there is no risk that the thickening will be carried out even further on a picture element, which has been converted from white into black for the thickening of a certain character pattern, a certain line pattern, or the like. In cases where one of other scanning techniques is employed, the processing can be carried out in the same manner by defining a judgment matrix appropriate for the scanning technique. Accordingly, the image thickening processing method and apparatus in accordance with the present invention do not depend upon the scanning techniques (the scanning directions).

In the storage device 2, the binary image signal representing the entire image, which has been read out with the image read-out apparatus 1, may be stored. Alternatively, in cases where the read-out operation with the image read-out apparatus 1 and processes with the digital stencil printer 4 can be carried out in synchronization with each other, it is sufficient for only the minimum amount of the binary image signal, which is necessary for the thickening means 3, to be stored in the storage device 2.

A different embodiment of the image thickening processing method and apparatus in accordance with the present invention will be described hereinbelow with reference to FIGS. 10 through 17. This embodiment enables markedly quick processing, in which the features of the present invention are utilized, to be carried out.

Figure 10:
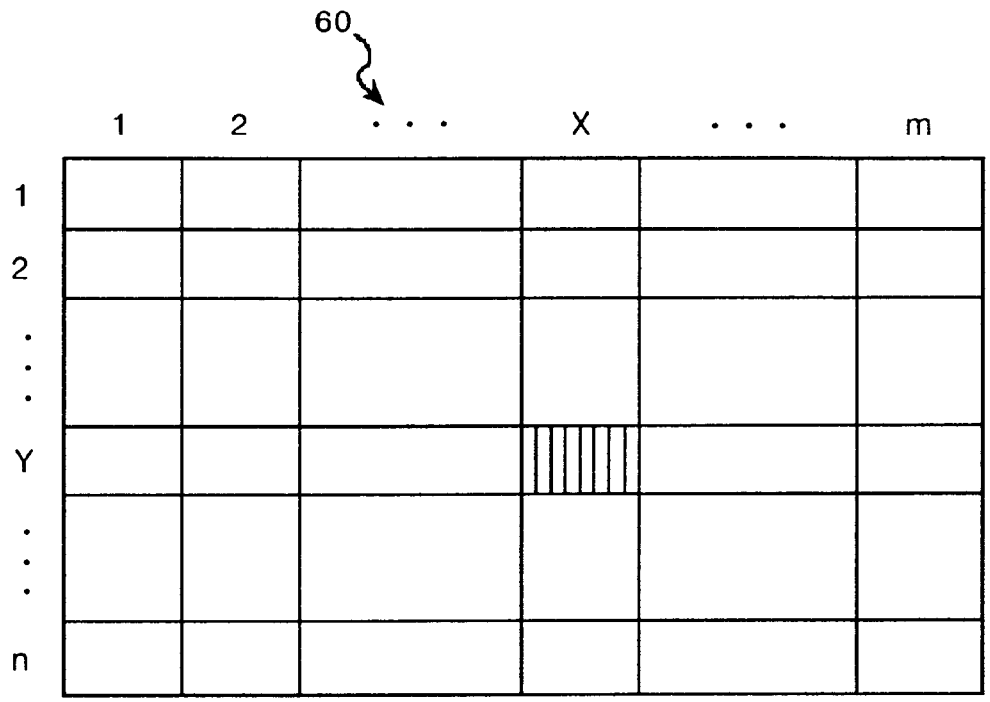
FIG. 10 is an explanatory view showing a binary image signal stored in a different embodiment of the image thickening processing apparatus in accordance with the present invention.
Figure 11:
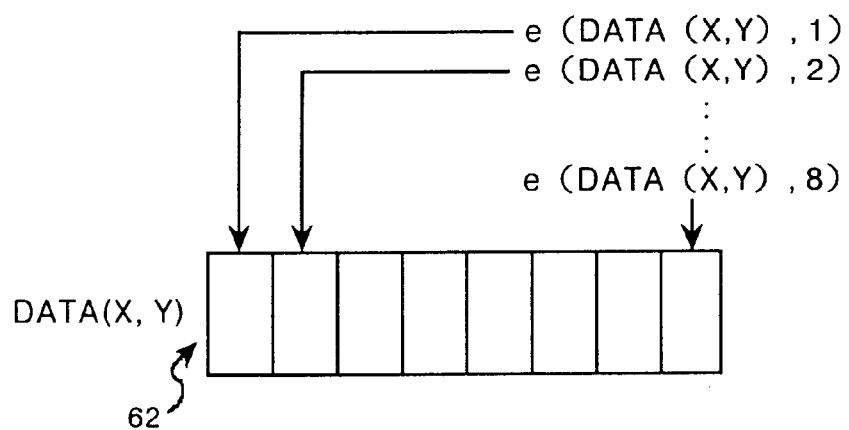
FIG. 11 is an explanatory view showing a two-dimensional array signal in the embodiment of FIG. 10.
Figure 12:
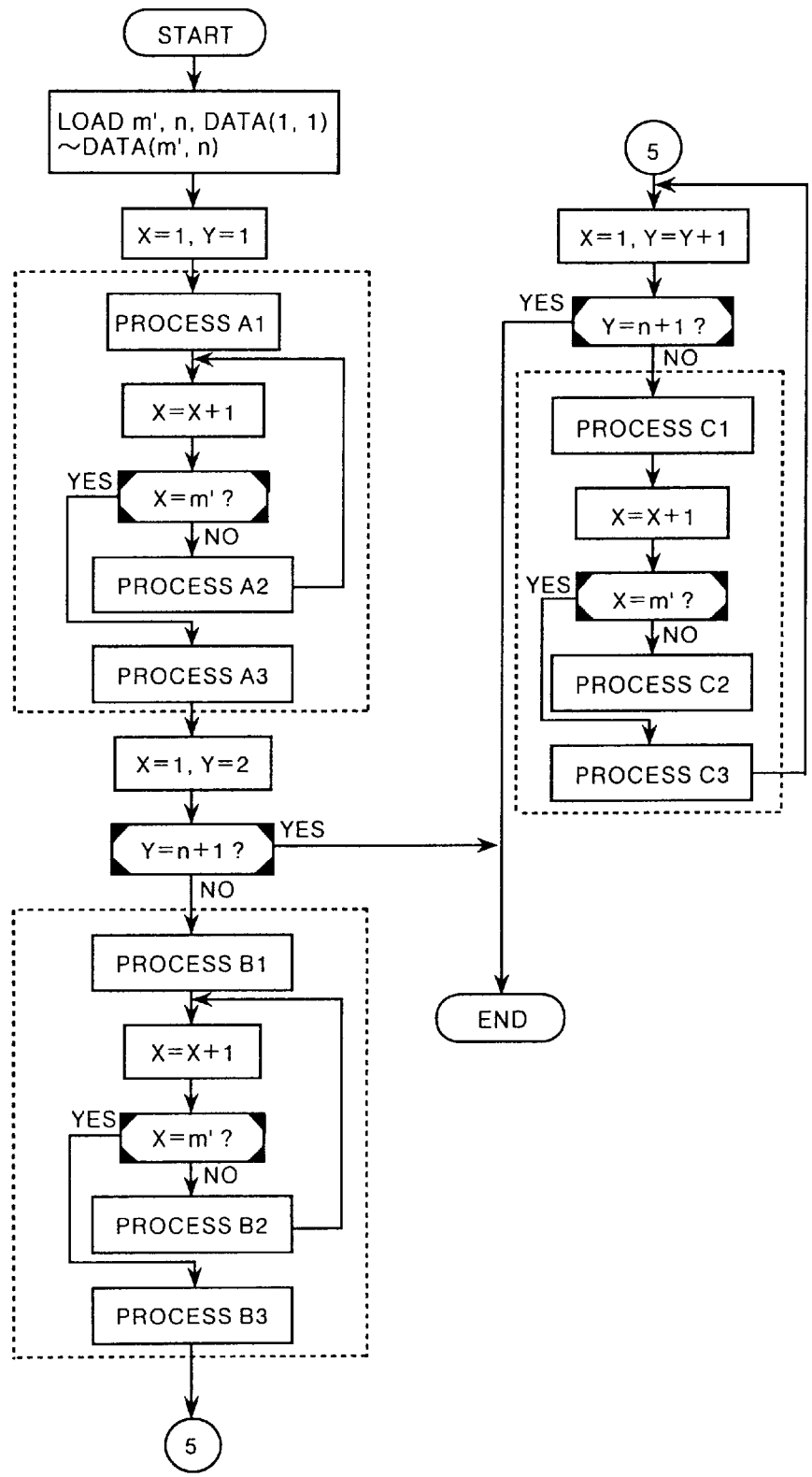
FIG. 12 is a flow chart showing entire processing carried out in the embodiment of FIG. 10.
Figure 13:
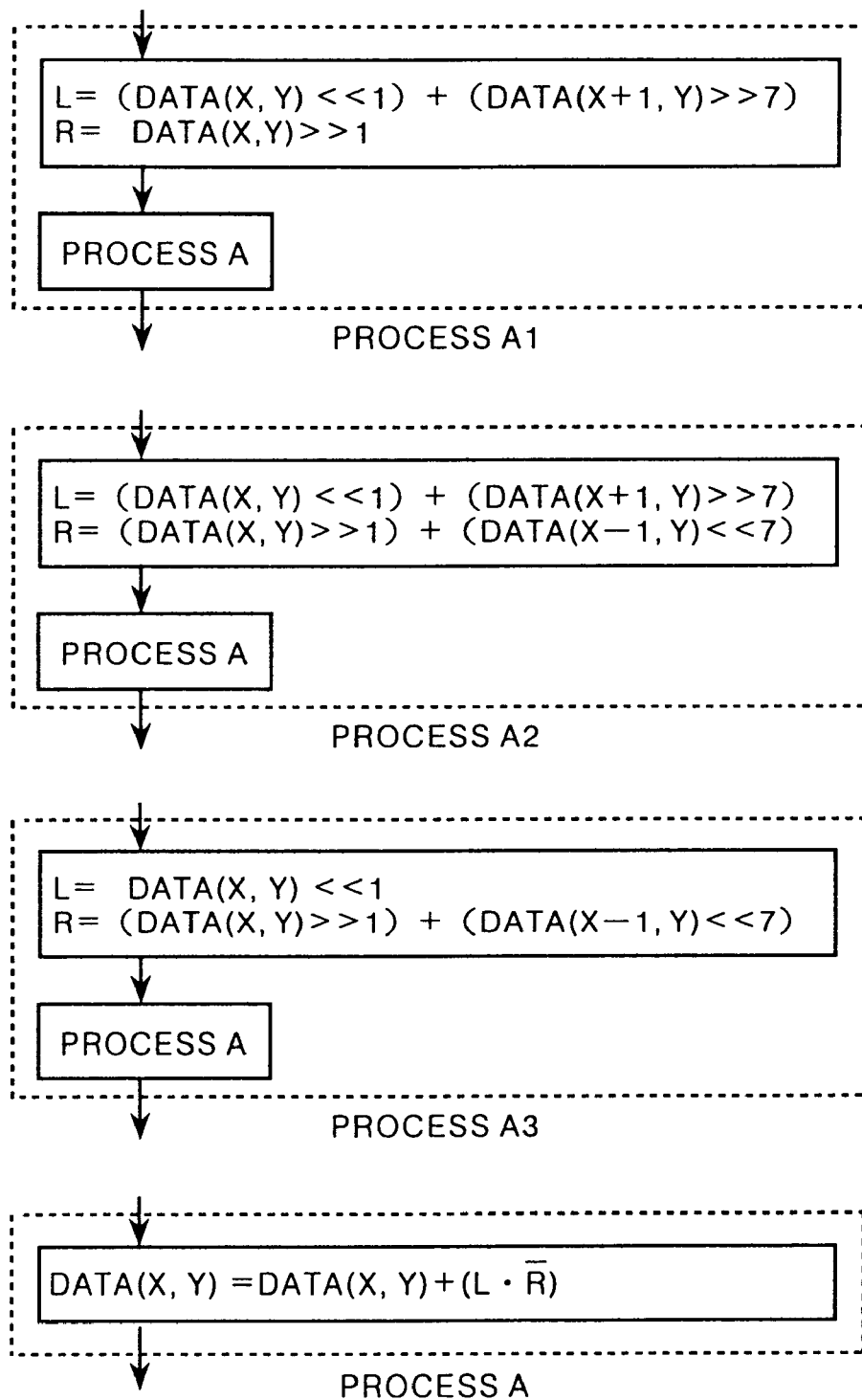
FIG. 13 is a block diagram showing how processes A1, A2, and A3 are carried out in the embodiment of FIG. 10.
Figure 14:
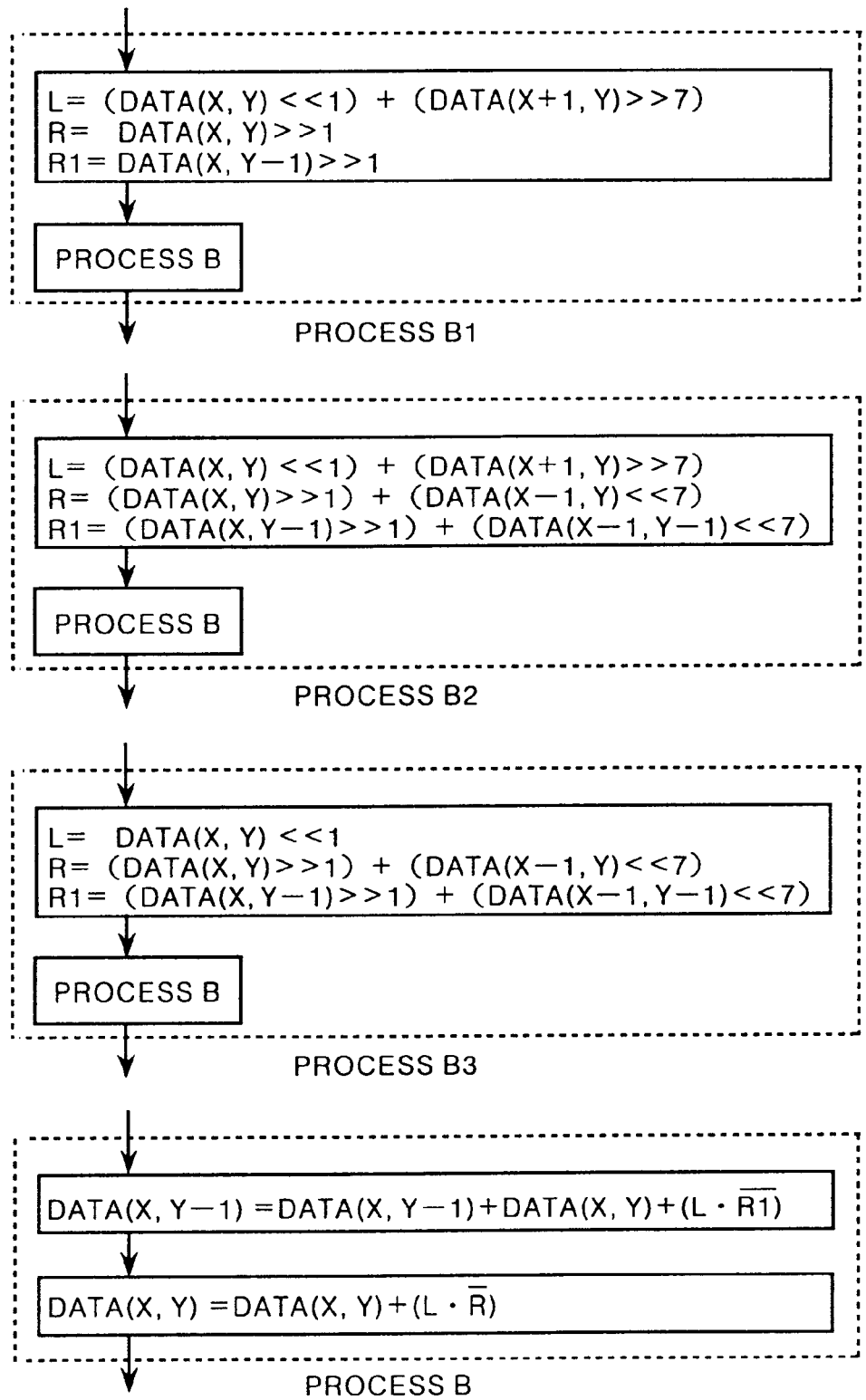
FIG. 14 is a block diagram showing how processes B1, B2, and B3 are carried out in the embodiment of FIG. 10.
Figure 15:
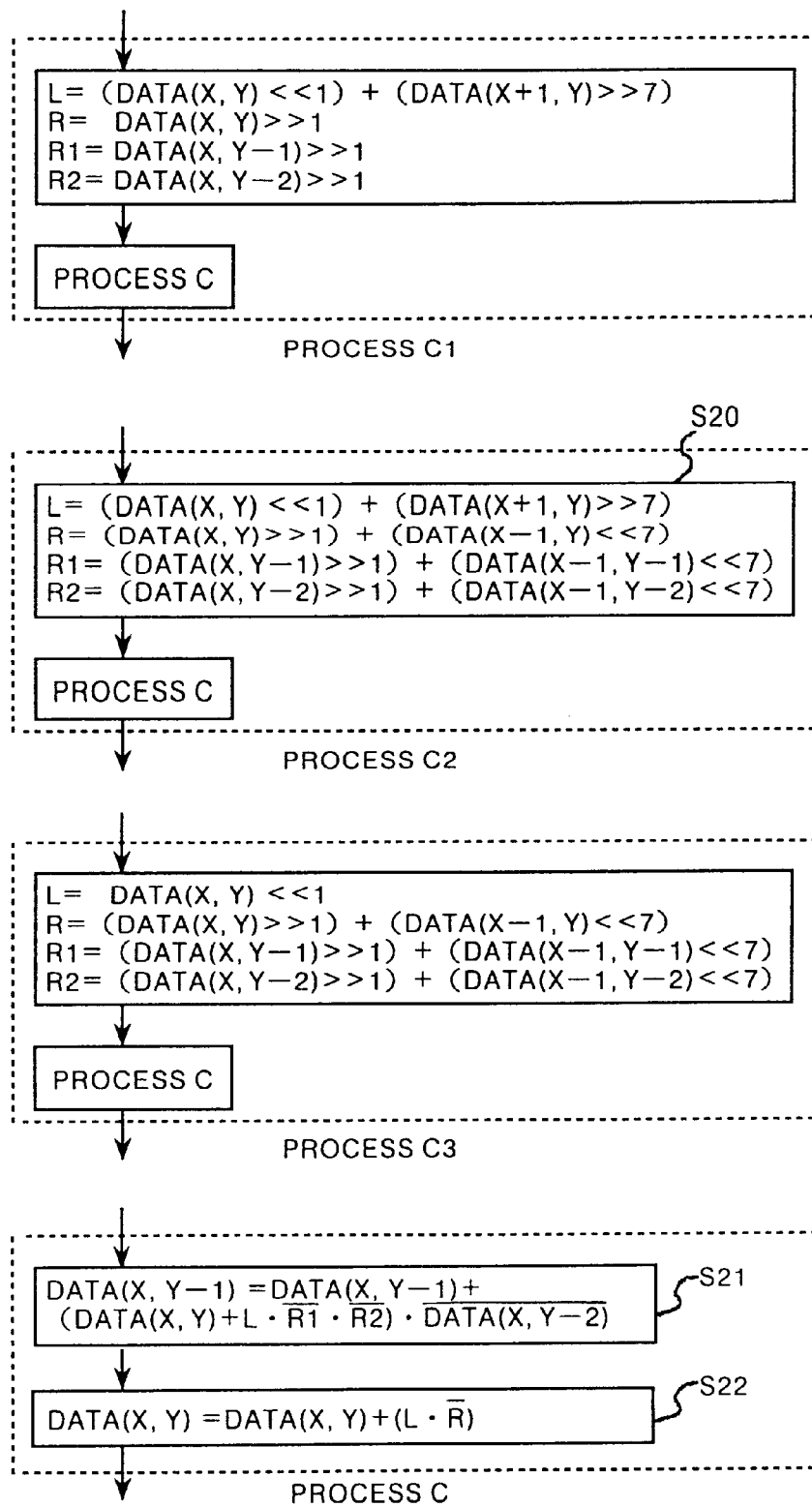
FIG. 15 is a block diagram showing how processes C1, C2, and C3 are carried out in the embodiment of FIG. 10.

FIG. 10 shows a binary image signal 61 processed in this embodiment. With reference to FIG. 10, the binary image signal 61, which represents a picture element array made up of n picture elements located along the sub-scanning direction and m'×8 picture elements along the main scanning direction (n≧1, m'≧2), is transmitted from the image read-out apparatus 1 into the storage device 2. As illustrated in FIG. 11, in the storage device 2, the binary image signal 61 is stored as m'×n number of two-dimensional array signals DATA(X, Y) 62. The two-dimensional array will hereinbelow be referred to as the "array signal." In the binary image signal 61, the position along the main scanning direction is represented by X, and the position along the sub-scanning direction is represented by Y. In this case, 1≦X≦m', and 1≦Y≦n.

FIG. 11 shows the constitution of the array signal DATA (X, Y) 62. As shown in FIG. 11, DATA(X, Y) has eight elements. An i'th element, as counted from the left, is represented by e(DATA(X, Y), i) and takes a value of 0 (representing white) or a value of 1 (representing black). At this time, the relationship expressed as e(DATA(X, Y), i)=d((X−1)×8+i, Y) obtains.

FIGS. 12, 13, 14, and 15 are flowcharts showing the control procedures in this embodiment. The control procedures have nine subroutines, i.e. processes A1, A2, A3, B1, B2, B3, C1, C2, and C3. Among the processes, C2 is a principal process and is ordinarily executed most frequently. If only the process C2 is employed, it will occur that the array signal subjected to the judgment and processing falls more outward than the binary image signal 61. Therefore, the other processes are carried out as exceptional processes.

The principal process C2 will be described hereinbelow. As illustrated as the process C2 in FIG. 15, in a step S20, judgment signals L, R, R1, and R2 having eight elements are loaded. As illustrated as a process C in FIG. 15, in a step S21, DATA(X, Y−1) is updated. Also, in a step S22, DATA (X, Y) is updated. The operation of DATA(X, Y)<<i represents a left shift of DATA(X, Y) by i bits, and e(DATA(X, Y), 9−i) through e(DATA(X, Y), 8) are set as being white (as a value of 0). The operation of DATA(X, Y)>>i represents a right shift of DATA(X, Y) by i bits, and e(DATA(X, Y), 1) through e(DATA(X, Y), i) are set as being white. In this case, 1≦i≦8. The operation of "+" with respect to the array signal represents the ORing of the elements of the array signal with each other. The operation of "·" represents the ANDing of the elements of the array signal with each other. The operation of "−" represents the logical NOT of each element of the array signal.

FIG. 16 shows an example of execution of the step S21. Of the picture element signals illustrated, the element indicated by the "×" mark is the one which has been altered into black by the step S21. An array signal 23 is the result obtained by carrying out the process 1, which is shown in FIG. 6, simultaneously for eight picture elements. Also, an array signal 24 is the result obtained by carrying out the process 2, which is shown in FIG. 6, simultaneously for eight picture elements. Specifically, in the step S21, the process 1 and the process 2 shown in FIG. 6 are carried out simultaneously for eight picture elements. FIG. 17 shows an example of execution of the step S22. As illustrated in FIG. 17, in the step S22, the process 3 shown in FIG. 6 is carried out simultaneously for eight picture elements.

In the processes C1, C2, and C3, the array signal DATA (X, Y−1) with respect to the row, which is upper by one row along the sub-scanning direction, R1, and the array signal DATA(X, Y−2) with respect to the row, which is upper by two rows along the sub-scanning direction, R2, are used. However, in cases where Y=1, these array signals are not present and therefore cannot be loaded. In order to eliminate such problems, exceptional processes A1, A2, and A3 are utilized. Also, in cases where Y=2, DATA(X, Y−2) and R2 are not present and therefore cannot be loaded. In order to eliminate such problems, exceptional processes B1, B2, and B3 are utilized. Further, incases where X=1, since DATA (X−1, Y) is not present, exceptional processes A1, B1, and C1 are utilized. In cases where X=m', since DATA(X+1, Y) is not present, exceptional processes A3, B3, and C3 are utilized.

This embodiment can be carried out by using a CPU controlled by a software. In this embodiment, the processing unit, in which the number of elements is eight, is used, and the thickening processing is carried out simultaneously for eight picture elements. Alternatively, the number of picture elements, which are processed simultaneously, may be altered by altering the size of the processing unit. For example, in cases where a CPU having a 32-bit bus is used, the size of the processing unit may be set to be 32 bits (the number of elements: 32). This embodiment can also be carried out with a logic circuit and a memory. With this embodiment, since the processing is carried out simultaneously for a plurality of picture elements, the processing can be carried out quickly.

In the two embodiments described above, a binary image obtained from a read-out apparatus, such as an image scanner, is processed. However, the image thickening processing method and apparatus in accordance with the present invention are also applicable when a binary image outputted from a computer, or the like, is subjected to the thickening processing.

What is claimed is:

1. An image thickening processing method, wherein a thickening processing is carried out on a binary image made up of a plurality of black picture elements and white picture elements, which are adjacent to one another along vertical and horizontal directions, the method comprising the steps of:
   i) setting each of the black picture elements as a black picture element of interest,
   ii) detecting a vertically adjacent picture element, which is adjacent to said black picture element of interest along a single vertical direction, a horizontally adjacent picture element, which is adjacent to said black picture element of interest along a single horizontal direction, and an obliquely adjacent picture element, which is simultaneously adjacent to said vertically adjacent picture element, said horizontally adjacent picture element, and said black picture element of interest, and iii) carrying out the thickening processing by:
  a) setting said vertically adjacent picture element as a black picture element only in cases where a picture element, which is adjacent to said vertically adjacent picture element even further along said single vertical direction, has been judged as being a white picture element,
  b) setting said horizontally adjacent picture element as a black picture element only in cases where a picture element, which is adjacent to said horizontally adjacent picture element even further along said single horizontal direction, has been judged as being a white picture element, and
  c) setting said obliquely adjacent picture element as a black picture element only in cases where all of a picture element, which is adjacent to said obliquely adjacent picture element even further along said single vertical direction, a picture element, which is adjacent to said obliquely adjacent picture element even further along said single horizontal direction, and a picture element, which is adjacent to said obliquely adjacent picture element obliquely on the side opposite to said black picture element of interest, have been judged as being white picture elements.

2. A method as defined in claim 1 wherein said single vertical direction is the upward direction, said single horizontal direction is the leftward direction, main scanning of the picture elements in the binary image is carried out along the rightward direction, and sub-scanning of the picture elements in the binary image is carried out along the downward direction, whereby the thickening processing for setting the adjacent picture element as a black picture element with respect to each black picture element of interest is carried out successively.

3. An image thickening processing apparatus, wherein a thickening processing is carried out on a binary image made up of a plurality of black picture elements and white picture elements, which are adjacent to one another along vertical and horizontal directions, the apparatus comprising:

i) a judgment means for:
  setting each of the black picture elements as a black picture element of interest,
  detecting a vertically adjacent picture element, which is adjacent to said black picture element of interest along a single vertical direction, a horizontally adjacent picture element, which is adjacent to said black picture element of interest along a single horizontal direction, and an obliquely adjacent picture element, which is simultaneously adjacent to said vertically adjacent picture element, said horizontally adjacent picture element, and said black picture element of interest, and
  making judgments as to:
    a) whether a picture element, which is adjacent to said vertically adjacent picture element even further along said single vertical direction, is or is not a white picture element,
    b) whether a picture element, which is adjacent to said horizontally adjacent picture element even further along said single horizontal direction, is or is not a white picture element, and
    c) whether all of a picture element, which is adjacent to said obliquely adjacent picture element even further along said single vertical direction, a picture element, which is adjacent to said obliquely adjacent picture element even further along said single horizontal direction, and a picture element, which is adjacent to said obliquely adjacent picture element obliquely on the side opposite to said black picture element of interest, are or are not white picture elements, and ii) a thickening means for:
  a) setting said vertically adjacent picture element as a black picture element only in cases where said picture element, which is adjacent to said vertically adjacent picture element even further along said single vertical direction, has been judged by said judgment means as being a white picture element,
  b) setting said horizontally adjacent picture element as a black picture element only in cases where said picture element, which is adjacent to said horizontally adjacent picture element even further along said single horizontal direction, has been judged by said judgment means as being a white picture element, and
  c) setting said obliquely adjacent picture element as a black picture element only in cases where all of said picture element, which is adjacent to said obliquely adjacent picture element even further along said single vertical direction, said picture element, which is adjacent to said obliquely adjacent picture element even further along said single horizontal direction, and said picture element, which is adjacent to said obliquely adjacent picture element obliquely on the side opposite to said black picture element of interest, have been judged by said judgment means as being white picture elements.

4. An apparatus as defined in claim 3 wherein said judgment means sets said single vertical direction as the upward direction, sets said single horizontal direction as the leftward direction, carries out main scanning of the picture elements in the binary image along the rightward direction, carries out sub-scanning of the picture elements in the binary image along the downward direction, and thereby successively makes said judgments with respect to each black picture element of interest.

* * * * *